UNITED STATES PATENT OFFICE.

JAMES W. MILLER, OF LEESBURG, TENNESSEE.

IMPROVEMENT IN MEDICAL COMPOUNDS OR SALVES.

Specification forming part of Letters Patent No. 153,008, dated July 14, 1874; application filed June 13, 1874.

*To all whom it may concern:*

Be it known that I, JAMES W. MILLER, of Leesburg, in the county of Washington and State of Tennessee, have invented a new and useful Improvement in Medical Compound, of which the following is a specification:

This invention and discovery relates to the "healing art;" and consists of a compound composed of the ingredients hereinafter named, combined in about the proportions specified.

In carrying out my discovery, I proceed as follows, viz: I take fourteen ounces of slippery-elm bark, (*Ulmus Americana*,) twelve ounces of the plant known as "life-everlasting," (*Gnaphalium*,) two ounces of mullein-tops, (*Verbascum thapsus*,) and put in a kettle holding two or more gallons, and fill the kettle with pure spring-water. I then put the kettle over a fire, and boil until the strength of the bark and plant is obtained. I then strain the liquid, and boil down to about one gallon; then I add six ounces of beef-tallow, six ounces of mutton-tallow, one pound of English rosin, one ounce of bees-wax, and one ounce of neat's-foot oil.

This compound is exposed to a slow fire (not sufficient to boil) until the water is evaporated. It is now removed from the fire, and allowed to cool; but while cooling the compound is stirred and worked until the ingredients are thoroughly mixed together, and when entirely cool is ready for use.

By this method a healing-salve is produced which is a sovereign remedy for all descriptions of sores, wounds, and bruises, swellings, ulcers, chronic or otherwise, and is essentially a "family medicine."

Having thus described my invention, I claim as new and desire to secure by Letters Patent—

The above-described medical compound or salve, substantially as and for the purposes set forth.

JAS. WESLEY MILLER.

Witnesses:
L. C. PEOPLES,
J. J. HUNT.